(12) United States Patent
Mukherjee et al.

(10) Patent No.: US 8,042,154 B2
(45) Date of Patent: Oct. 18, 2011

(54) ALLOWING NETWORK ACCESS FOR PROXY MOBILE IP CASES FOR NODES THAT DO NOT SUPPORT CHAP AUTHENTICATION

(75) Inventors: Arghya Mukherjee, Mountain View, CA (US); Bhaskar Bhupalam, Sunnyvale, CA (US); Ashwin Anilkumar Kabadi, Mumbai (IN); Venkatanarayana Muppala, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1085 days.

(21) Appl. No.: 11/316,098

(22) Filed: Dec. 21, 2005

(65) Prior Publication Data
US 2007/0107047 A1 May 10, 2007

(30) Foreign Application Priority Data
Nov. 7, 2005 (IN) .......................... 2954/DEL/2005

(51) Int. Cl.
G06F 21/20 (2006.01)
(52) U.S. Cl. ................. 726/3; 380/270; 455/411; 726/5
(58) Field of Classification Search .................. 455/411; 380/270; 726/5
See application file for complete search history.

(56) References Cited

U.S. PATENT DOCUMENTS

| | | | |
|---|---|---|---|
| 5,586,260 A | 12/1996 | Hu | |
| 6,760,444 B1 * | 7/2004 | Leung | 380/270 |
| 6,785,823 B1 | 8/2004 | Abrol et al. | |
| 6,829,473 B2 | 12/2004 | Raman et al. | |
| 6,956,846 B2 | 10/2005 | Lewis et al. | |
| 2001/0012777 A1 | 8/2001 | Igarashi et al. | |
| 2003/0220107 A1 | 11/2003 | Lioy et al. | |
| 2003/0224757 A1 * | 12/2003 | Dyck et al. | 455/411 |
| 2004/0114559 A1 * | 6/2004 | Wang | 370/338 |
| 2005/0195766 A1 | 9/2005 | Nasielski et al. | |

FOREIGN PATENT DOCUMENTS
WO WO 01/13666 2/2001

OTHER PUBLICATIONS

Maino. "EAP: A Common Extensible Encapsulation Protocol for Authentication in FC-SP." Published to the T11 Group website on Dec. 9, 2002. p. 1-18.*
Davis, Peter T. "Securing and Controlling Cisco Routers." Published 2002. 1 page.*

(Continued)

Primary Examiner — Vivek Srivastava
Assistant Examiner — Kevin Richards
(74) Attorney, Agent, or Firm — Weaver Austin Villeneuve & Sampson LLP (57) ABSTRACT

The disclosed embodiments support proxy Mobile IP registration for nodes that do not implement CHAP. This is accomplished, in part, through the generation of a CHAP challenge and response by either a AAA server or a network device such as a PDSN or Foreign Agent. If the CHAP challenge and response is generated by the AAA server, the AAA server provides the CHAP challenge and response to the network device. In this manner, the network device may generate a Mobile IP registration request based upon the CHAP challenge and response.

28 Claims, 6 Drawing Sheets

OTHER PUBLICATIONS

Mun Gi Choi et al., "A New Multimedia Network Architecture using 3G CDMA2000" Vehicular Technology Conference, 2000. IEEE VTS Fall VTC 2000. 52nd Sep. 24-28, 2000, Piscataway, NJ, USA, IEEE, vol. 6, Sep. 24, 2000, pp. 2937-2944, XP010525116 ISBN: 978-0-7803-6507-0.

EP Search Report mailed Dec. 8, 2008 from corresponding EP Application No. 06836995.8-1525.

C. Perkins et al., "IP Mobility Support for IPv4," RFC 3344, Aug. 2002. (99 pages).

C. Rigney et al., "Remote Authentication Dial In User Service (RADIUS)," RFC 2138, Apr. 1997. (65 pages).

C. Finseth, "An Access Control, Protocol Sometimes Called TACACS," RFC 1492, Jul. 1993. (21 pages).

3rd Generation partnership Project 2 "3GPP2", IS-835 D, X.P0011-001-D, "cdma2000 Wireless IP Network Standard: Introduction", http:www.3gpp2.org/Public_html/Misc/v&vindex.cfm, Copyright 2003 (31 pages).

3rd Generation Partnership Project 2 "3GPP2", IS-835 D, X.P0011-002-D, "cdma2000 Wireless IP Network Standard: Simple IP and Mobile IP Services", http://www.3gpp2.org/Public_html/Misc/v&vindex/cfm, Copyright 2003.

3rd Generation Partnership Project 2 "3GPP2", IS-835 D, X.P0011-003-D, "cdma2000 Wireless IP Network Standard: Packet Data Mobility and Resource Management", http://www.3gpp2.org/Public_html/Misc/v&vindex.cfm, Copyright 2003.

3rd Generation Partnership Project 2 "3GPP2", IS-835 D, X.P0011-004-D, "cdma2000 Wireless IP Network Standard: Quality of Service and Header Reduction", http://www.3gpp2.org/Public_html/Misc/v&vindex.cfm, Copyright 2003.

3rd Generation Partnership Project 2 "3GPP2", IS-835 D, X.P0011-005-D, "cdma2000 Wireless IP Network Standard: Accounting Services and 3GPP2 RADIUS VSAs", http://www.3gpp2.org/Public_html/Misc/v&vindex.cfm, Copyright 2003.

3rd Generation Partnership Project 2 "3GPP2", IS-835 D, X.P0011-006-D, "cdma2000 Wireless IP Network Standard: PrePaid Packet Data Services", http://www.3gpp2.org/Public_html/Misc/v&vindex.cfm, Copyright 2003.

B. Lloyd et al., "PPP Authentication Protocols," RFC 1334, Oct. 1992. (16 pages).

International Search Report and Written Opinion of the International Searching Authority dated Apr. 26, 2007, for related PCT Application No. PCT/US2006/43237.

EP Office Action dated Mar. 25, 2009 from Application No. 06836995.8; 1 pg.

CN First Non-Final Office Action dated Oct. 18, 2010, from CN Appl. No. 200680041553.5.

\* cited by examiner

ALLOWING NETWORK ACCESS FOR PROXY MOBILE IP CASES FOR NODES THAT DO NOT SUPPORT CHAP AUTHENTICATION

RELATED APPLICATIONS

This application claims priority from Indian Application No. 2954/DEL/2005, entitled "Allowing Network Access for Proxy Mobile IP Cases for Nodes that Do Not Support CHAP Authentication," by Mukherjee et al, filed in India on Nov. 7, 2005, which is incorporated herein by reference for all purposes.

BACKGROUND OF THE INVENTION

The present invention relates to Mobile IP network technology. More particularly, the present invention relates to supporting proxy Mobile IP registration for nodes that do not support the Challenge Handshake Authentication Protocol (CHAP).

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one sub-network and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for Ipv4," August 2002. Mobile IP is also described in the text "Mobile IP Unplugged" by J. Solomon, Prentice Hall. Both of these references are incorporated herein by reference in their entireties and for all purposes.

Figure 1:
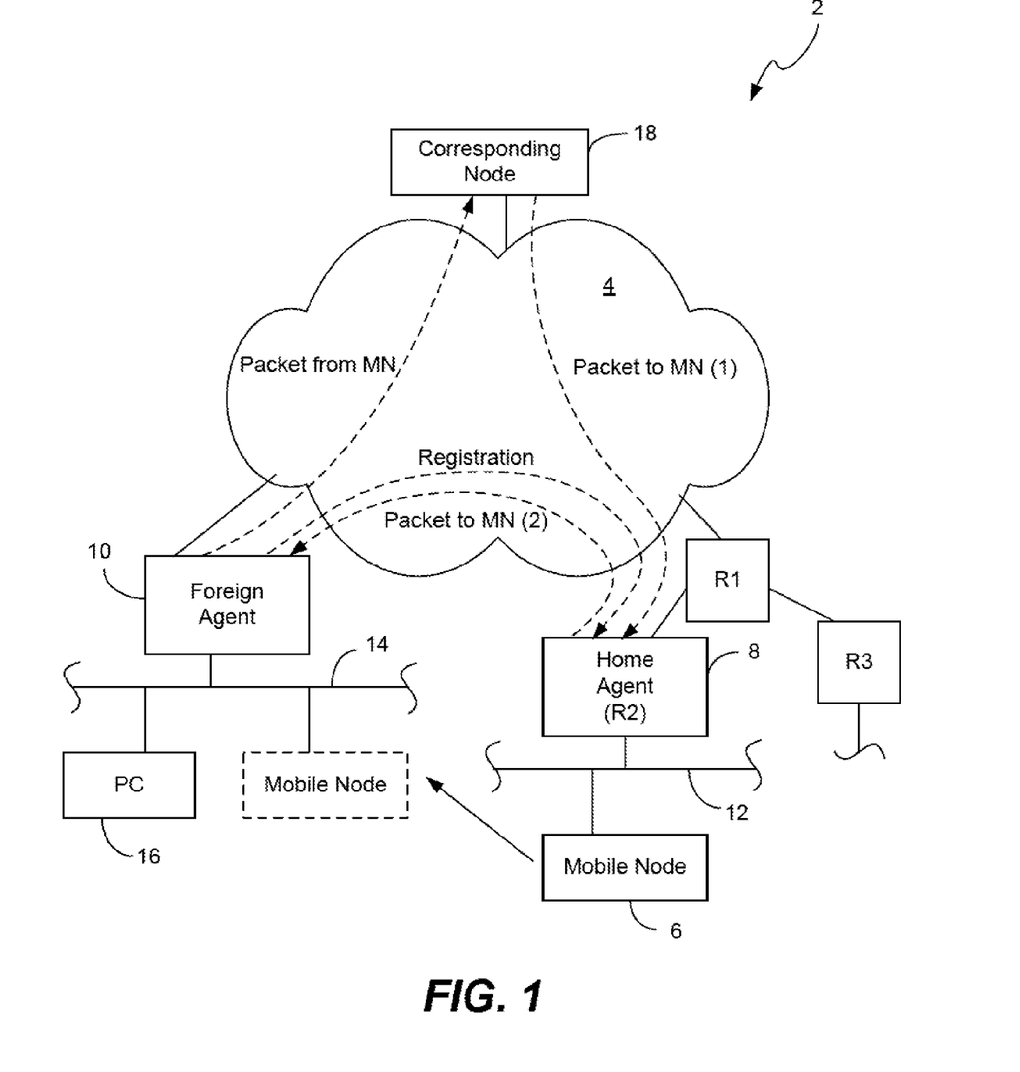
FIG. 1 is a diagram of a Mobile IP network segment and associated environment.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In a Third Generation Partnership Project 2 (3GPP2)/CDMA2000 network, the Foreign Agent is implemented in what is generally referred to as a Packet Data Serving Node (PDSN). In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

Since a node may not support Mobile IP, a node that changes its location within a network cannot initiate registration with its Home Agent. Proxy mobile IP support (i.e., proxy registration) may therefore be performed by a proxy entity other than the node, such as an Access Point, a Foreign Agent, or a Packet Data Serving Node (PDSN) (e.g., in a CDMA2000 network) on behalf of the node. Typically, multiple Access Points, Foreign Agents or PDSNs can be placed throughout a facility to give users the ability to roam freely throughout an extended area while maintaining uninterrupted access to all network resources. Once a node is registered with a Home Agent, packets may be forwarded by the Home Agent to the PDSN or Foreign Agent.

In order to send a registration request on behalf of the node, the proxy entity needs the node's IP address and Home Agent address (i.e., default gateway) in order to compose a registration request packet. In addition, the proxy entity also ascertain's the node's sub-network network mask (i.e., netmask) in order to ascertain whether Mobile IP proxy services are required. Specifically, when the proxy entity determines from the source address of a data packet and the netmask that the node is located on the subnet identical to the subnet of the proxy entity, no Mobile IP service is required on behalf of the node as shown at block. However, when the proxy entity determines from the source address that the node is not located on the subnet of the proxy entity, proxy Mobile IP service is performed by the proxy entity is performed on behalf of the node.

Thus, the proxy entity acts as a proxy Mobile Node to register a client (i.e., node) with its Home Agent. Specifically, the proxy entity identifies or allocates a Home Agent and sends a registration request to the Home Agent to establish a Mobile IP session on behalf of the client. The client receives packets addressed to its home address throughout the Mobile IP session. In this manner, a node may roam while maintaining connectivity to the network.

There are a number of authentication mechanisms that may be used to authenticate a user. These authentication mechanisms include Password Authentication Protocol (PAP), CHAP, Extensible Authentication Protocol (EAP), and Microsoft Challenge Handshake Authentication Protocol (MS-CHAP). However, the Mobile IP protocol operates under the assumption that a CHAP challenge and response are used to authenticate a Mobile Node. In other words, the registration request is required to include the CHAP challenge and response.

During the Mobile IP registration process, a Mobile Node typically provides a CHAP challenge and response in its Mobile IP registration request. Specifically, the Foreign Agent typically advertises a CHAP challenge in an agent advertisement. When the Mobile Node composes a Mobile IP registration request, it includes a Mobile-Foreign Challenge Extension (MFCE) including the CHAP challenge and a CHAP response as a Mobile Node-AAA key to be shared between the Mobile Node and a AAA server. When the CHAP challenge and response are provided to the AAA server, the AAA server uses this information to authenticate the Mobile Node based upon a shared password associated with the CHAP challenge and response.

In a proxy Mobile IP situation in a network such as a CDMA2000 network, the PDSN does not receive a registration request from the node and therefore does not receive a CHAP challenge and response from the node. However, if the node negotiates a Point to Point Protocol (PPP) session using the CHAP protocol, the CHAP challenge and response are received by the PDSN from the node during PPP negotiation. In these situations, the PDSN may generate a registration request on behalf of the node using the CHAP challenge and response received during PPP negotiation.

Unfortunately, many nodes do not support the CHAP protocol. For example, PAP is often the only supported protocol, since it is an older protocol. Since the PDSN does not receive a CHAP challenge and response during PPP negotiation for these nodes, the PDSN cannot construct a registration request including a CHAP challenge and response. Accordingly, proxy Mobile IP is unsupported in these systems.

In view of the above, it would be beneficial if proxy Mobile IP could be supported for nodes that do not use CHAP.

SUMMARY OF THE INVENTION

Various embodiments of the invention support proxy Mobile IP registration for nodes that do not support CHAP. This is accomplished, in part, through the generation of a CHAP challenge and response by either a AAA server or an entity such as a PDSN or Foreign Agent. In this manner, the PDSN or Foreign Agent may generate a Mobile IP registration request based upon the CHAP challenge and response.

A AAA server supports authentication, authorization, and accounting. While authentication determines "who" an entity is, authorization determines what services a user is allowed to perform, or access. A class of servers known as "AAA" or triple-A servers may be employed. Various protocols such as the Remote Authentication Dial In User Service (RADIUS) and TACACS+ may be implemented to provide such a server. Note that the Home Agent or Foreign Agent providing accounting information to the server must provide communications in formats required by the AAA server protocol. RFC 2138 describes the RADIUS Protocol and is hereby incorporated by reference. Similarly, RFC 1492 describes TACACS and the Internet-Draft "The TACACS+Protocol Version 1.78" describes TACACS+. Both of these documents are incorporated herein by reference for all purposes.

In accordance with one aspect of the invention, the AAA server generates the CHAP challenge and response, which is subsequently provided to the PDSN or Foreign Agent. Specifically, when the AAA server receives a request message (e.g., authentication request) that identifies a node, it obtains a password associated with the node (e.g., from a node profile maintained by the AAA server). The AAA server generates a CHAP challenge, which may be generated randomly or through other suitable mechanism. The AAA server generates a CHAP response from the password and the CHAP challenge. The AAA server then sends a reply message (e.g., authentication reply) indicating the CHAP challenge and the CHAP response to the PDSN (or Foreign Agent), thereby enabling the PDSN (or Foreign Agent) to generate a Mobile IP registration request based upon the CHAP challenge and response received in the reply message.

As set forth above, when a PDSN or Foreign Agent sends a request message identifying a node to a AAA server, it subsequently receives a reply message indicating a CHAP challenge and response. The PDSN obtains the CHAP challenge and response from the reply message. The PDSN (or Foreign Agent) then composes a Mobile IP registration request message based upon the CHAP challenge and response.

In accordance with one embodiment, the AAA server is a single entity. However, in other embodiments, two AAA servers may function to generate the CHAP challenge and response, as well as provide the CHAP challenge and response to the PDSN or Foreign Agent. Specifically, a Local AAA (LAAA) server in the foreign network and a Home AAA (HAAA) server in the home network may be implemented. This enables the LAAA server to contact the HAAA server when it cannot authenticate the node.

In accordance with another aspect of the invention, the PDSN or Foreign Agent generates the CHAP challenge and response, which it subsequently uses to generate a Mobile IP registration request. Specifically, the PDSN (or Foreign Agent) sends a request message (e.g., authentication request) to a AAA server, and receives a reply message (e.g., authentication reply) from the AAA server. The reply message includes a password (e.g., associated with the node). Once the PDSN (or Foreign Agent) obtains the password from the reply message, it generates a CHAP challenge. The PDSN (or Foreign Agent) may then generate a CHAP response from the CHAP challenge and password. The PDSN (or Foreign Agent) then composes a Mobile IP registration request message based upon the CHAP challenge and response.

As set forth above, when the AAA server receives a request message identifying a node, it obtains a password associated with the node (e.g., from a node profile maintained by the AAA server). The AAA server then sends a reply message to the PDSN or Foreign Agent, thereby enabling the PDSN (or Foreign Agent) to generate a CHAP response using the password for use in generating a Mobile IP registration request including a CHAP challenge generated by the PDSN (or Foreign Agent) and the CHAP response.

In accordance with another aspect of the invention, the invention pertains to a system operable to perform and/or initiate any of the disclosed methods in a AAA server or a proxy entity such as a PDSN, Foreign Agent, or Access Point. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments support proxy Mobile IP registration for nodes that do not use CHAP. As will be described in further detail below, this may be accomplished through the generation of a CHAP challenge and response by a AAA server as set forth with reference to FIG. 4 or by an entity such as a PDSN as set forth with reference to FIG. 5. Once the CHAP challenge and response have been generated, the PDSN may generate a Mobile IP registration request based upon the CHAP challenge and response.

Figure 2:
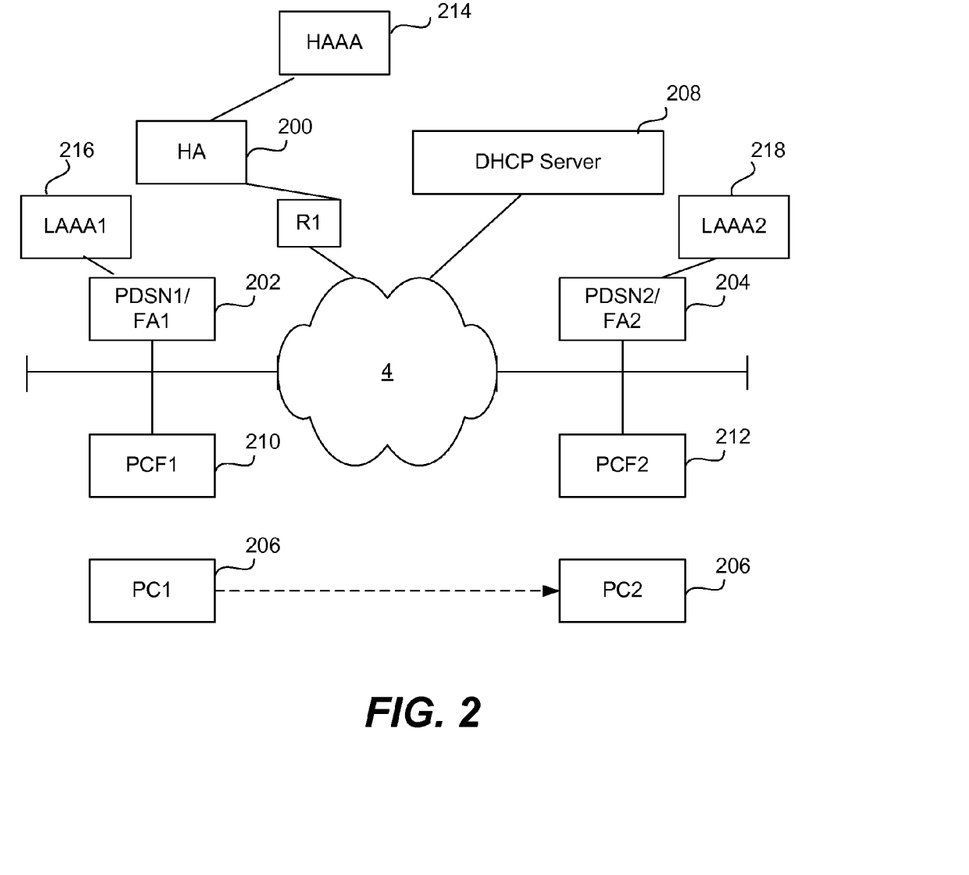
FIG. 2 is a diagram illustrating an exemplary system in which proxy Mobile IP may be implemented by one or more PDSNs.

FIG. 2 is a block diagram illustrating a system in which the present invention may be implemented. In the following description, the disclosed embodiments are described with reference to a CDMA2000 network, which is implemented using a Third Generation Partnership Project 2 (3GPP2) architecture. An example 3GPP2 architecture is described in IS-835 D entitled "X.P0011-00x-D - cdma2000 Wireless IP Standard (6 DOCUMENTS: -001 thru -006)". A Packet Data Serving Node (PDSN) serves as an access router in a 3GPP2/CDMA2000 network. Although the present invention is described as being implemented in a CDMA2000 network, the present invention may also be implemented in another type of Mobile IP network. Thus, those functions described below as being performed by a PDSN may also be performed by an entity such as a Foreign Agent or Access Point.

As shown in FIG. 2, a node 206 may wish to roam from its Home Agent 200 to a first PDSN/Foreign Agent 202. Similarly, once attached to the first PDSN 202, the node 206 may again wish to roam to a second PDSN/Foreign Agent 204. Although the node 206 may have an assigned IP address, when the node 206 roams, it is preferable for the node to maintain this assigned IP address. For instance, although a DHCP server 208 typically dynamically assigns a new IP address to a node when its location within a network has changed, it is preferable to maintain the IP address originally assigned to the node by the DHCP server 208.

In a CDMA2000 network, a Packet Control Function (PCF) 210 and Packet Control Function (PCF) 212 are coupled to the PDSNs 202 and 204, respectively. The PCFs 210, 212, are typically coupled to a Base Station Control (BSC) (not shown) and Mobile Switching Center (MSC) (not shown). Typically, a mobile node implementing Mobile IP registers and de-registers with its Home Agent through the registration process. However, during proxy registration, registration is initiated by another network device such as a PDSN on behalf of the node. Similarly, de-registration may be initiated by the PDSN on behalf of the roaming node. For instance, node 206 that has roamed to the first PDSN 202 is registered with the node's Home Agent 200 when the first PDSN 206 composes and sends a registration request packet via the first PDSN 202. Thus, the first Foreign Agent's visitor table and the Home Agent's mobility binding table are updated to indicate that the node has roamed to the first Foreign Agent 202. When the node 206 roams to the second PDSN 204, the node 206 may be de-registered (e.g., by one of the PDSNs 210, 212, either of the Foreign Agents 202, 204 or the Home Agent 200). In other words, the first Foreign Agent 202 updates its visitor table to reflect the movement of the node 206. Similarly, the Home Agent's mobility binding table is updated to reflect the movement of the node 206 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the node with the Home Agent. Alternatively, the visitor table may be maintained and updated by the PDSN.

The Home Agent 200 may authenticate the node by contacting a Home AAA server (HAAA) 214 located in the home network. Similarly, the first PDSN/FA 202 may authenticate the node via a first Local AAA server (LAAA1) 216 located in the local network associated with the first PDSN/FA 202, while the second PDSN/FA 204 may authenticate the node via a second Local AAA server (LAAA2) 218. Authentication will be described in further detail below with reference to FIGS. 4-5.

Figure 3:
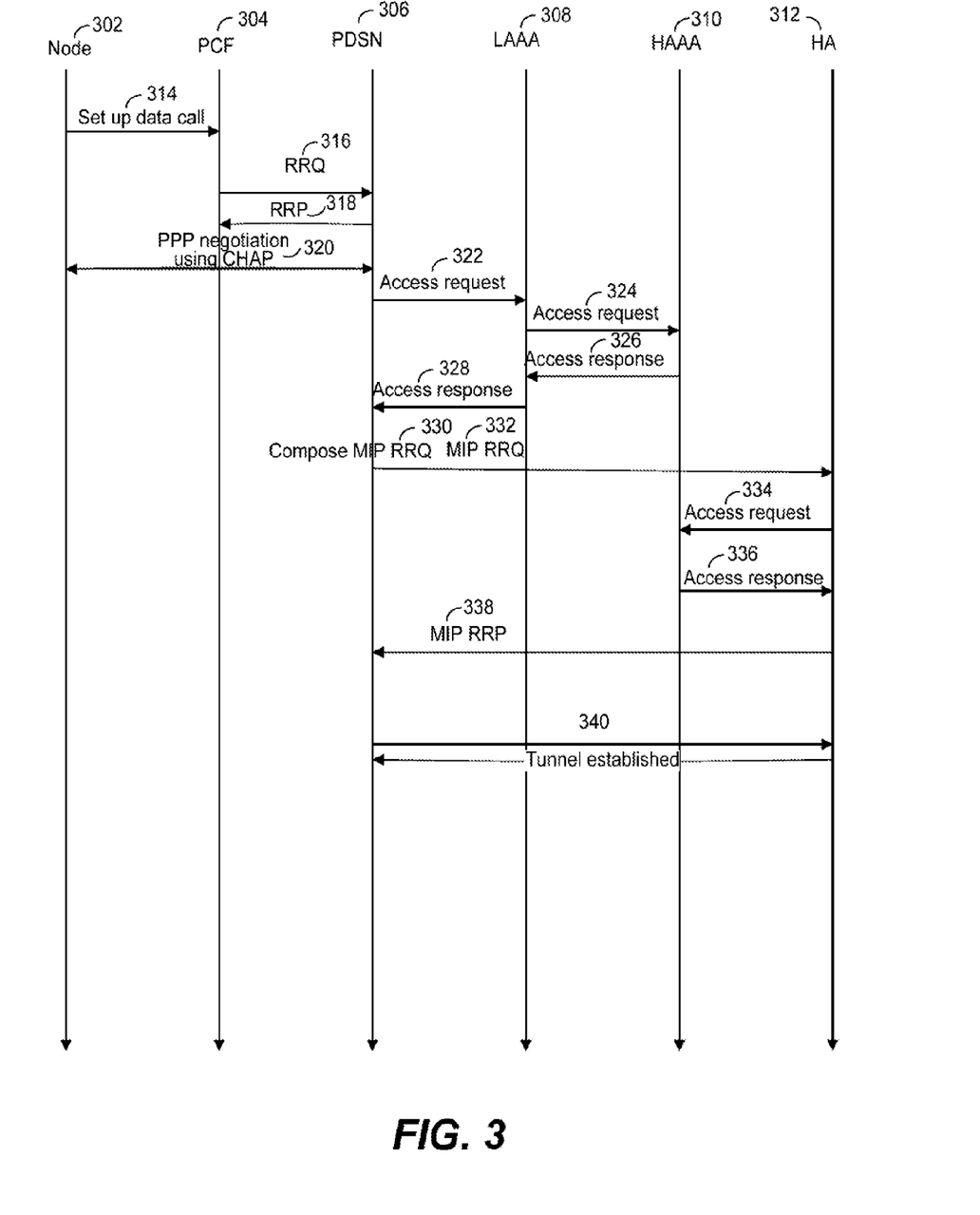
FIG. 3 is a transaction flow diagram illustrating a method of performing proxy Mobile IP registration in a CDMA2000 network for nodes that support CHAP.

Proxy Mobile IP registration is currently supported for nodes that support CHAP. FIG. 3 is a transaction flow diagram illustrating a method of performing proxy Mobile IP registration in a CDMA2000 network for nodes that support CHAP. Processes performed by a node that does not support Mobile IP, a Packet Control Function (PCF), a PDSN, a Local AAA (LAAA) server located in the foreign network in which the PDSN is located, a Home AAA (HAAA) server located in the home network, and a Home Agent (HA) are represented by vertical lines 302, 304, 306, 308, 310, and 312, respectively. When a data call is set up between the node and PCF at 314, the PCF sends a registration request (RRQ) to the PDSN at 316. Assuming that the call is successful, the PDSN sends a registration reply (RRP) to the PCF at 318. The node engages in PPP negotiation using the CHAP protocol at 320, enabling the PDSN to obtain the CHAP challenge and response from the node.

The PDSN sends an authentication request (e.g., RADIUS access request) to a AAA server for PPP authentication, and in reply receives an authentication response (e.g., RADIUS access response) from the AAA server authenticating the user as a proxy Mobile IP user. As shown, the PDSN typically sends an authentication request to a LAAA as shown at 322, which may be forwarded to a HAAA server at 324 if the LAAA server cannot authenticate the node. In these instances, the HAAA server sends an authentication response to the LAAA server at 326, which is forwarded to the PDSN at 328.

The PDSN composes a Mobile IP registration request on behalf of the node at 330 using the PPP challenge and response obtained during PPP negotiation and sends the registration request to the Home Agent at 332. In order to authenticate the registration request, the Home Agent typically sends an authentication request to the HAAA server at 334, which authenticates the Mobile IP registration request and sends an authentication response at 336 to the Home Agent. The Home Agent processes the registration request and upon receiving the authentication response sends a Mobile IP registration reply to the PDSN at 338. A tunnel is then established between the Home Agent and the PDSN at 340. A tunnel is also established between the PDSN and the node.

Authentication requests and responses are sent to a AAA server in a AAA format. As shown in FIG. 3, authentication requests and responses may include RADIUS access requests and responses.

Currently, proxy Mobile IP is unsupported for nodes that do not perform PPP negotiation using the CHAP protocol. One alternative for authenticating a node that does not use CHAP during PPP negotiation is to statically configure a shared password at the PDSN and a node that does not support Mobile IP, enabling the password to be used to authenticate the node. However, storing such passwords at a foreign entity such as the PDSN is a security violation, and would compromise the security of the system.

As will be described in further detail below, various embodiments of the invention support proxy Mobile IP registration for nodes that do not support CHAP. For instance, nodes may perform PPP negotiation using the PAP or EAP protocol. As will be described in further detail below, a CHAP challenge and response are generated by either a AAA server or PDSN. Once the PDSN obtains this CHAP challenge and response, the PDSN may generate a Mobile IP registration request in accordance with Mobile IP standards requiring that the Mobile IP registration request include the CHAP challenge and response.

Generally, in a CDMA network, the Home Agent will access a AAA server to authenticate a node, unless the Home Agent maintains local security associations. In the described embodiments, both a Local AAA (LAAA) server and Home AAA (HAAA) server are illustrated. However, it is important to note that a single AAA server (e.g., LAAA server) may authenticate a node without contacting another AAA server (e.g., HAAA server).

Figure 4:
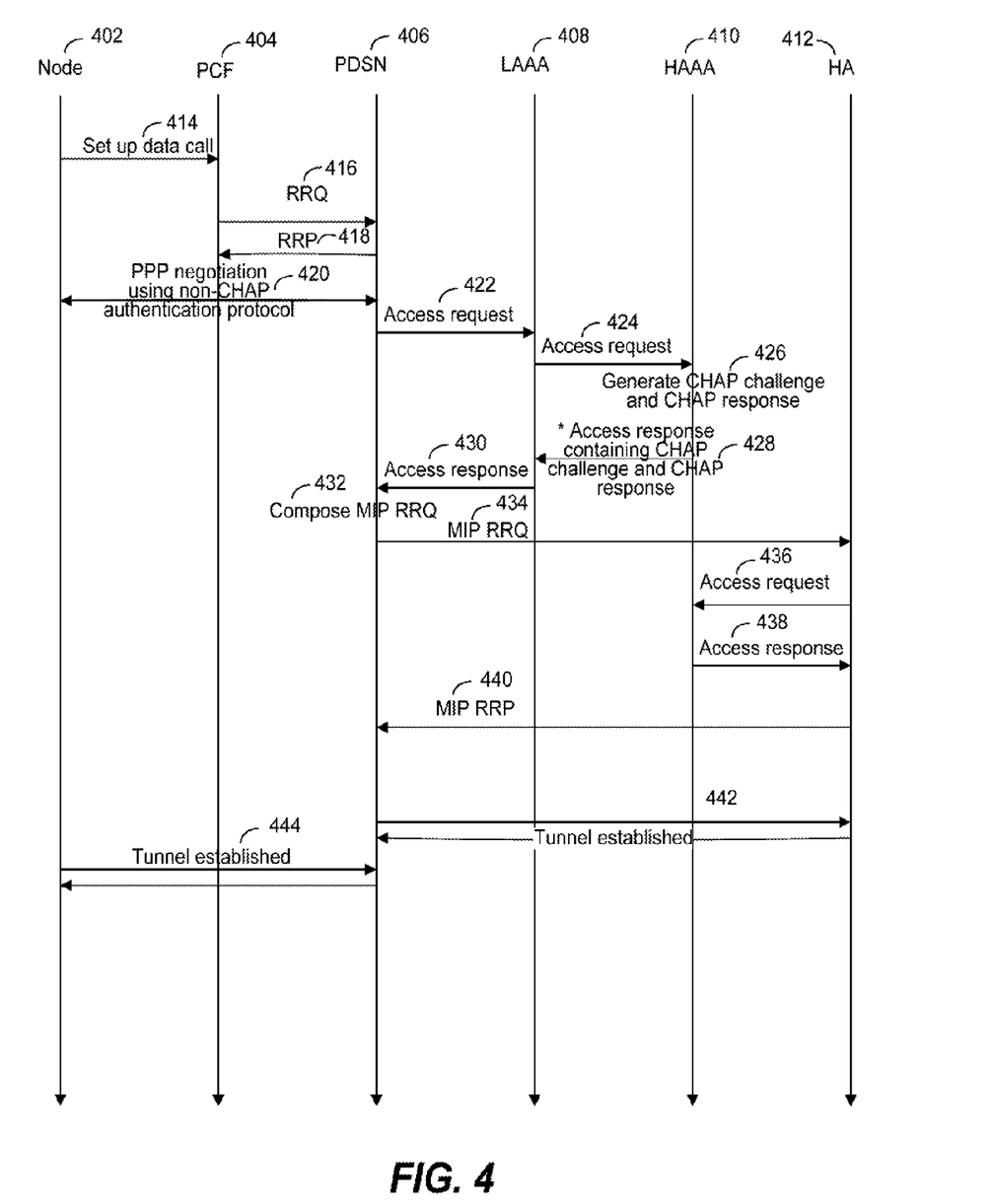
FIG. 4 is a transaction flow diagram illustrating a method of performing proxy Mobile IP registration by a PDSN using a CHAP challenge and response generated by a AAA server in accordance with a first embodiment of the invention.

FIG. 4 is a transaction flow diagram illustrating a method of performing proxy Mobile IP registration by a PDSN using a CHAP challenge and response generated by a AAA server in accordance with a first embodiment of the invention. Processes performed by a node that does not support Mobile IP, Packet Control Function (PCF), PDSN, Local AAA (LAAA) server located in the foreign network in which the PDSN is located, Home AAA (HAAA) server located in the home network, and Home Agent (HA) are represented by vertical lines 402, 404, 406, 408, 410, and 412, respectively. When a data call is set up between the node and PCF at 414, the PCF sends a registration request (RRQ) to the PDSN at 416. Assuming that the call is successful, the PDSN sends a registration reply (RRP) to the PCF at 418. The node engages in PPP negotiation using a non-CHAP authentication protocol such as PAP or EAP at 420. Since the PPP negotiation is not performed using CHAP, the PDSN does not receive a CHAP challenge and response during PPP negotiation.

In order to authenticate the node, the PDSN sends an authentication request (e.g., access request) identifying the node to a AAA server, and in reply receives an authentication response (e.g., access response) from the AAA server authenticating the user as a proxy Mobile IP user. As shown, the PDSN typically sends an authentication request to a LAAA server as shown at 422, which may be forwarded to a HAAA server at 424 if the LAAA server cannot authenticate the node. For instance, this may occur if the LAAA server does not have a node profile for the node. A node profile for a node generally includes a password for the node.

When the authentication request is received, the HAAA server generates a CHAP challenge and response at 426. Specifically, the HAAA server accesses the node's profile to verify that the node is a proxy Mobile IP user. More particularly, in accordance with one embodiment, the HAAA server obtains a password associated with the node from the node's profile. In addition, the HAAA server generates a CHAP challenge. For instance, the CHAP challenge may be generated via a random number generator. The HAAA server then generates a CHAP response from the password and the CHAP challenge. For instance, the CHAP response may be generated by obtaining a hash of the CHAP challenge and the password using a hashing function such as MD-5. The HAAA server may also update the node profile to include the CHAP challenge and response.

In this example, the HAAA server generates the CHAP challenge and response. However, it is important to note that a single AAA server (e.g., LAAA server) may authenticate a node without contacting another AAA server (e.g., HAAA server). Thus, either the LAAA server or the HAAA server may generate the CHAP challenge and response.

Once the CHAP challenge and response have been generated, the HAAA server sends an authentication response to the LAAA server indicating or including the CHAP challenge and response at 428. For instance, the CHAP challenge and response may be provided in one or more attributes of the authentication response. The LAAA server then forwards the authentication response to the PDSN at 430. Authentication requests and responses may be transmitted in accordance with a AAA protocol such as RADIUS or TACACS+. For instance, as shown in this example, the authentication requests may be RADIUS access requests and the authentication responses may be RADIUS access responses.

Upon receiving the authentication response, the PDSN obtains the CHAP challenge and response from the authentication response and composes a Mobile IP registration request based upon the CHAP challenge and response on behalf of the node at 432. For instance, the registration request may include the CHAP challenge and response. Specifically, when the Mobile Node composes a Mobile IP registration request, it includes a Mobile-Foreign Challenge Extension (MFCE) including the CHAP challenge and the CHAP response as a shared Mobile Node-AAA key. The PDSN then sends the registration request to the Home Agent at 434.

In order to authenticate the registration request, the Home Agent sends an authentication request to the HAAA server at 436, which authenticates the Mobile IP registration request and sends an authentication response at 438 to the Home Agent. Specifically, as described above, when the CHAP challenge and response are provided to a AAA server, the AAA server uses this information to authenticate the Mobile Node based upon the shared password associated with the CHAP challenge and response.

The Home Agent sends a Mobile IP registration reply to the PDSN at 440. A tunnel is then established between the Home Agent and the PDSN at 442. In addition, a tunnel is also established between the PDSN and the node at 444.

Figure 5:
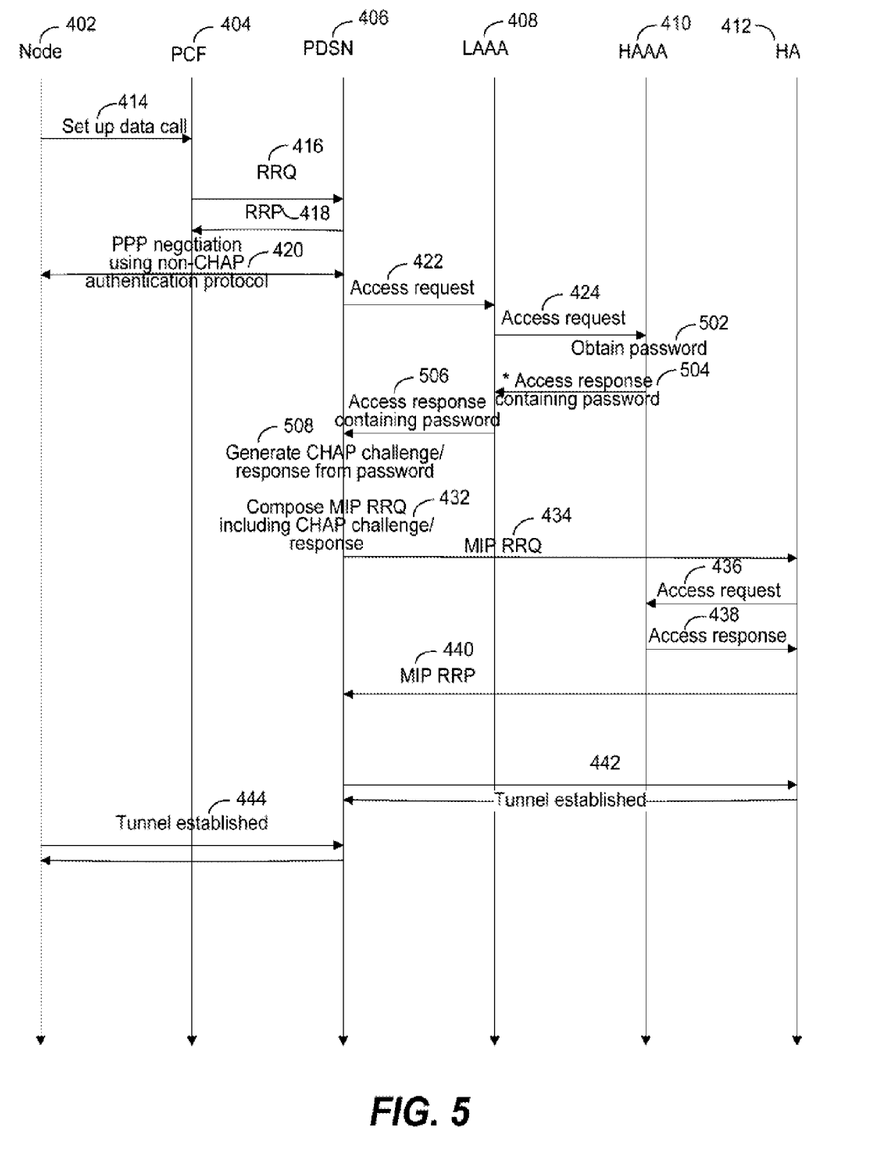
FIG. 5 is a transaction flow diagram illustrating a method of performing proxy Mobile IP registration by a PDSN using a CHAP challenge and response generated by the PDSN in accordance with a second embodiment of the invention.

FIG. 5 is a transaction flow diagram illustrating a method of performing proxy Mobile IP registration by a PDSN using a CHAP challenge and response generated by the PDSN in accordance with a second embodiment of the invention. Steps 414-420 are performed as set forth above with reference to FIG. 4 to establish a PPP session.

When an authentication request identifying a node is transmitted as described above with respect to steps 422-424, the HAAA server accesses the node's profile to verify that the node is a proxy Mobile IP user. More particularly, the HAAA server obtains the node's password from its node profile at 502. The HAAA server then transmits an authentication response including the node's password to the LAAA server at 504. For instance, the password may be provided in an attribute of the authentication response. The LAAA server then forwards the authentication response to the PDSN at 506.

In this example, the HAAA server obtains the node's password from the node profile maintained by the server. However, it is important to note that a single AAA server (e.g., LAAA server) may authenticate a node without contacting another AAA server (e.g., HAAA server). Thus, either the LAAA server or the HAAA server may obtain the node's password from its node profile. Authentication requests and responses may be transmitted in accordance with a AAA protocol such as RADFUS or TACACS+, as set forth above..

When the authentication response including the password is received by the PDSN, the PDSN generates a CHAP challenge and response at 508. Specifically, the PDSN obtains the password from the authentication response. In addition, the PDSN generates a CHAP challenge. For instance, the CHAP challenge may be generated via a random number generator. The PDSN then generates a CHAP response from the password and the CHAP challenge. For instance, the CHAP response may be generated by obtaining a hash of the CHAP challenge and the password using MD-5.

The PDSN then composes a registration request on behalf of the node based upon the CHAP challenge and response generated by the PDSN, and registration of the node with the Home Agent is completed as described above with reference to steps 432-444.

The above-described embodiments enable proxy Mobile IP registration for nodes that do not support CHAP. This is accomplished through the generation of a CHAP challenge and response by an entity such as a AAA server or PDSN. Once the CHAP challenge and response have been generated, the PDSN may generate a registration request on behalf of the Mobile Node that includes the CHAP challenge and response.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent, Foreign Agent, or PDSN) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 6:
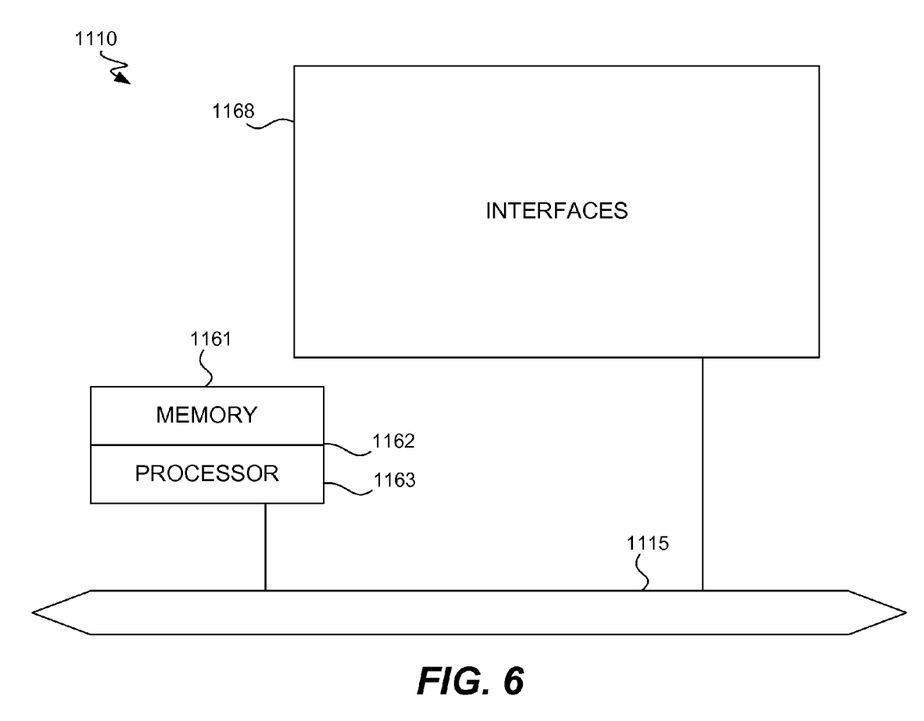
FIG. 6 is a diagrammatic representation of a router in which embodiments of the present invention may be implemented.

Referring now to FIG. 6, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for authentication and registration functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer-readable medium in which a carrier wave travels over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Moreover, although the example described refers primarily to IPv4, the present invention may be used with other versions of IP. In addition, although the description refers to the implementation of proxy Mobile IP in a PDSN, the disclosed embodiments may also be implemented in a Foreign Agent, Access Point, or other entity. Thus, the disclosed embodiments need not be performed in a CDMA2000 network. Therefore, the described embodiments should be taken as illustrative and not restrictive, and the invention should not be limited to the details given herein but should be defined by the following claims and their full scope of equivalents.

What is claimed is:

1. A method, comprising:
   receiving a request message identifying a node by a AAA server from a network device after the network device performs Point to Point Protocol (PPP) negotiation with the node, the request message being in a AAA format;
   obtaining by the AAA server a password associated with the node;
   generating a Challenge Handshake Authentication Protocol (CHAP) challenge by the AAA server;
   generating a CHAP response by the AAA server from the password and the CHAP challenge; and
   sending a reply message in a AAA format and indicating the CHAP challenge and the CHAP response by the AAA server to the network device, thereby enabling the network device to generate and send a Mobile IP registration request including the CHAP challenge and CHAP response on behalf of the node such that the network device performs proxy Mobile IP registration on behalf of the node, wherein the node does not support Mobile IP, and wherein the node does not support the CHAP protocol.

2. The method as recited in claim 1, further comprising:
   storing the CHAP challenge and the CHAP response in association with the password.

3. The method as recited in claim 1, wherein the request message is a RADIUS access request and the reply message is a RADIUS access reply.

4. The method as recited in claim 1, wherein the node supports Password Authentication Protocol (PAP), and wherein the node is authenticated using PAP during the PPP negotiation.

5. The method as recited in claim 1, wherein the AAA server is in a local network in which the network device is located.

6. The method as recited in claim 1, wherein the AAA server is in a home network of the node.

7. A method, comprising:
performing Point to Point Protocol (PPP) negotiation by a network device with a node, wherein the network device does not receive a CHAP challenge and response during the PPP negotiation with the node;
sending by the network device a request message identifying the node to a AAA server, the request message being in a AAA format;
receiving by the network device a reply message in a AAA format and indicating a Challenge Handshake Authentication Protocol (CHAP) challenge and a CHAP response;
obtaining by the network device the CHAP challenge and the CHAP response from the reply message;
composing by the network device a Mobile IP registration request message on behalf of a node that does not support Mobile IP based upon the CHAP challenge and the CHAP response, wherein the node does not support the CHAP protocol; and
sending by the network device the Mobile IP registration request message on behalf of the node, thereby performing proxy Mobile IP registration on behalf of the node.

8. The method as recited in claim 7, wherein the request message is a RADIUS access request and the reply message is a RADIUS access reply.

9. The method as recited in claim 7, wherein the node supports Password Authentication Protocol (PAP), and wherein performing PPP negotiation comprises authenticating the node using PAP during the PPP negotiation.

10. The method as recited in claim 7, wherein the AAA server is in a local network in which the network device is located or a home network of the node.

11. The method as recited in claim 7, wherein the reply message includes the CHAP challenge and the CHAP response.

12. The method as recited in claim 1, wherein the request message is received from a Foreign Agent or a Packet Data Serving Node (PDSN), and wherein the network device to which the reply message is sent is the Foreign Agent or PDSN.

13. A method, comprising:
receiving a request message identifying a node by a AAA server from a network device after the network device performs Point to Point Protocol (PPP) negotiation with the node, the request message being in a AAA format;
obtaining by the AAA server a password associated with the node; and
sending by the AAA server a reply message in a AAA format and including the password to the network device, wherein the network device is a PDSN or Foreign Agent, thereby enabling the PDSN or Foreign Agent to generate a Challenge Handshake Authentication Protocol (CHAP) response using the password for use in generating and sending a Mobile IP registration request including a CHAP challenge generated by the PDSN or Foreign Agent and the CHAP response, wherein the Mobile IP registration request is generated and sent on behalf of the node by the PDSN or Foreign Agent such that the PDSN or Foreign Agent performs proxy Mobile IP registration on behalf of the node, wherein the node does not support Mobile IP, and wherein the node does not support the CHAP protocol.

14. The method as recited in claim 13, wherein the request message is a RADIUS access request and the reply message is a RADIUS access reply.

15. The method as recited in claim 13, wherein the node supports Password Authentication Protocol (PAP), and wherein the node is authenticated using PAP during the PPP negotiation.

16. The method as recited in claim 13, wherein the AAA server is in a local network in which the PDSN or Foreign Agent is located.

17. The method as recited in claim 13, wherein the AAA server is in a home network of the node.

18. The method as recited in claim 13, wherein the request message is received from the PDSN or Foreign Agent.

19. A method, comprising:
performing Point to Point Protocol (PPP) negotiation by a network device with a node, wherein the network device does not receive a CHAP challenge and response during the PPP negotiation with the node;
sending a request message identifying the node by the network device to a AAA server, the request message being in a AAA format;
receiving a reply message by the network device from the AAA server, the reply message being in a AAA format and including a password;
obtaining the password by the network device from the reply message;
generating a Challenge Handshake Authentication Protocol (CHAP) challenge by the network device;
generating by the network device a CHAP response from the CHAP challenge and the password; and
composing and sending by the network device a Mobile IP registration request message on behalf of the node based upon the CHAP challenge and the CHAP response generated by the network device, wherein the node does not support Mobile IP, and wherein the node does not support the CHAP protocol, thereby performing proxy Mobile IP registration on behalf of the node.

20. The method as recited in claim 19, wherein the request message is a RADIUS access request and the reply message is a RADIUS access reply.

21. The method as recited in claim 19, wherein the node supports Password Authentication Protocol (PAP), and wherein performing PPP negotiation comprises authenticating the node using PAP during the PPP negotiation.

22. The method as recited in claim 19, wherein the AAA server is in a local network in which the network device is located or a home network of the node.

23. The method as recited in claim 19, wherein the network device is a Packet Data Serving Node (PDSN) or Foreign Agent.

24. A network device, comprising:
means for performing Point to Point Protocol (PPP) negotiation with a node without receiving a CHAP challenge and response during the PPP negotiation with the node;
means for sending a request message identifying the node to a AAA server, the request message being in a AAA format;

means for receiving a reply message in a AAA format and indicating a Challenge Handshake Authentication Protocol (CHAP) challenge and a CHAP response;

means for obtaining the CHAP challenge and the CHAP response from the reply message; and means for composing and sending a Mobile IP registration request message on behalf of the node based upon the CHAP challenge and the CHAP response, wherein the node does not support Mobile IP, and wherein the node does not support the CHAP protocol, thereby performing proxy Mobile IP registration on behalf of the node.

25. The network device as recited in claim 24, wherein the node supports Password Authentication Protocol (PAP), and wherein the means for performing PPP negotiation comprises means for authenticating the node using PAP during the PPP negotiation.

26. An apparatus, comprising:
a processor; and
a memory, at least one of the processor or the memory being adapted for:
performing Point to Point Protocol (PPP) negotiation by the apparatus with a node, wherein the apparatus does not receive a CHAP challenge and response during the PPP negotiation with the node;
sending a request message identifying the node by the apparatus to a AAA server, the request message being in a AAA format;
receiving by the apparatus a reply message in a AAA format and indicating a Challenge Handshake Authentication Protocol (CHAP) challenge and a CHAP response;
obtaining by the apparatus the CHAP challenge and the CHAP response from the reply message; and
composing and sending a Mobile IP registration request message by the apparatus on behalf of the node based upon the CHAP challenge and the CHAP response, wherein the node does not support Mobile IP, and wherein the node does not support the CHAP protocol, thereby performing proxy Mobile IP registration on behalf of the node.

27. The apparatus as recited in claim 26, wherein the node supports Password Authentication Protocol (PAP), and wherein performing PPP negotiation comprises authenticating the node using PAP during the PPP negotiation.

28. The apparatus as recited in claim 26, wherein the apparatus is a Packet Data Serving Node (PDSN) or Foreign Agent.

* * * * *